US010914637B2

(12) United States Patent
Lin et al.

(10) Patent No.: US 10,914,637 B2
(45) Date of Patent: Feb. 9, 2021

(54) ULTRASENSITIVE THERMO-MECHANICAL BOLOMETER

(71) Applicant: Massachusetts Institute of Technology, Cambridge, MA (US)

(72) Inventors: Yuxuan Lin, Cambridge, MA (US); Xiang Ji, Cambridge, MA (US); Tomas Palacios, Belmont, MA (US); Jing Kong, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 45 days.

(21) Appl. No.: 16/449,410

(22) Filed: Jun. 23, 2019

(65) Prior Publication Data

US 2019/0390950 A1  Dec. 26, 2019

Related U.S. Application Data

(60) Provisional application No. 62/689,104, filed on Jun. 23, 2018.

(51) Int. Cl.
| | |
|---|---|
| *G01J 5/20* | (2006.01) |
| *G01B 7/16* | (2006.01) |
| *F16K 31/00* | (2006.01) |
| *G01J 5/08* | (2006.01) |

(52) U.S. Cl.
CPC .............. *G01J 5/20* (2013.01); *F16K 31/002* (2013.01); *G01B 7/18* (2013.01); *G01J 5/0853* (2013.01)

(58) Field of Classification Search
CPC ....................................................... G01J 5/20
See application file for complete search history.

(56) References Cited

U.S. PATENT DOCUMENTS

| | | | |
|---|---|---|---|
| 6,444,972 B1* | 9/2002 | Datskos | G01J 5/40 250/207 |
| 2015/0253196 A1* | 9/2015 | Roukes | G01J 5/44 374/117 |
| 2019/0277702 A1* | 9/2019 | Aleman | G01J 5/20 |

OTHER PUBLICATIONS

D. Das, et al., "Exceptionally Large Positive and Negative Anisotropic Thermal Expansion of an Organic Crystalline Material," 9 Nature Materials 36-39 (Nov. 22, 2009).

(Continued)

*Primary Examiner* — Yara B Green
(74) *Attorney, Agent, or Firm* — Modern Times Legal; Robert J. Sayre

(57) ABSTRACT

A thermo-mechanical bolometer includes a substrate and a sensing component mounted on the substrate. The sensing element comprises (a) at least one thermal-actuation component mounted in parallel with the substrate and (b) a strain sensor mounted on the at least one layer of thermal-actuation component. The at least one thermal-actuation component alone or in combination (a) absorbs electromagnetic waves and converts energy from absorbed electromagnetic waves into a change in temperature and (b) converts the change in temperature into a deformation of the at least one layer. The strain sensor comprises a layer of fragments with a gap space between the fragments, wherein the strain sensor senses the deformation or mechanical movement and exhibits a change in electrical resistance in response to the sensed deformation or mechanical movement.

19 Claims, 2 Drawing Sheets

(56) References Cited

OTHER PUBLICATIONS

T.W. Kenny, et al., "Novel Infrared Detector Based on a Tunneling Displacement Transducer," 59 Appl. Phys. Lett. 1820-22 (Oct. 7, 1991).
Z. Qian, et al., "Zero-Power Infrared Digitizers Based on Plasmonically Enhanced Micromechanical Photoswitches," 12 Nature Nanotechnology 969-974 (Sep. 11, 2017).

* cited by examiner

ULTRASENSITIVE THERMO-MECHANICAL BOLOMETER

RELATED APPLICATION

This application claims the benefit of U.S. Provisional Application No. 62/689,104, filed 23 Jun. 2018, the entire content of which is incorporated herein by reference.

GOVERNMENT SUPPORT

This invention was made with government support under Grant No. DE-SC0001088 awarded by the Department of Energy and under Grant No. W911NF-13-D-0001 awarded by the Army Research Office. The Government has certain rights in the invention.

BACKGROUND

Infrared (IR) technologies, originally connected with night vision, surveillance, and remote controlling in military applications, have been shifting gradually to applications for civilian use, including medical, industry, earth resources, and automotive applications. For example, medical diagnostics can be assisted by IR thermography, in which the IR scanning detects spatial temperature abnormality and identifies cancers or other trauma. Another example is remote sensing. With high-resolution IR imagers and/or spectrographs mounted on aircrafts or satellites, it is possible to identify and localize specific chemical elements or compounds. This technology has been widely used in mineral search, geological or environmental surveys, inspection of natural hazards and disasters, etc.

A bolometer is a device for measuring the power of incident electromagnetic (EM) radiation via the heating of a material with a temperature-dependent electrical resistance.

The figure of merit for a bolometer is the temperature coefficient of resistance (TCR) which is defined as:

$$TCR = \frac{1}{R}\frac{dR}{dT}, \quad (1)$$

with R and T representing resistance and temperature, respectively.

Traditional bolometers typically employ the inherent electronic properties of materials that has a temperature dependence, such as the thermally excited carrier densities, scatterings of carriers, or even transitions of crystalline structures. Table 1 summarized some of the state-of-the-art bolometric materials that are being used in uncooled IR detection today. The most successful bolometric material that has been widely used in commercialized IR cameras is vanadium oxide ($VO_x$), with which the TCR could be up to 0.1 $K^{-1}$.

Table 1 (summary of the TCR of mainstream bolometric materials):

| Material | TCR ($K^{-1}$) @ 295 K |
|---|---|
| Metal | 0.003 to 0.005 |
| Thermistors (($MnNiCO)_3O_4$) | 0.04 |
| a-Silicon | −0.025 to 0.06 |
| $VO_x$ | −0.1 to −0.03 |
| Si diode | 0.002 |
| Amorphous GeSiO | <0.051 |
| AlGaAs/GaAs | <0.045 |
| YBaCuO | 0.01 to 0.04 |

SUMMARY

An ultrasensitive thermo-mechanical bolometer and methods for its fabrication and use are described herein, where various embodiments of the apparatus and methods may include some or all of the elements, features and steps described below.

A thermo-mechanical bolometer includes a strain sensor mounted in parallel with (e.g., on) at least one thermal-actuation component. The strain sensor is configured to expand with the thermal-actuation component(s). The at least one thermal-actuation component alone or in combination (a) absorbs electromagnetic waves and converts energy from absorbed electromagnetic waves into a change in temperature and (b) converts the change in temperature into a deformation of the at least one thermal-actuation component. The strain sensor comprises a layer of fragments with a gap space between the fragments, wherein the strain sensor senses the deformation or mechanical movement and exhibits a change in electrical resistance in response to the sensed deformation or mechanical movement.

In a method for measuring electromagnetic radiation, a thermo-mechanical bolometer is provided that comprises a sensing component mounted on a substrate, wherein the sensing component comprises at least one thermal-actuation component. Electromagnetic radiation is absorbed with the thermal-actuation component to produce a change in temperature. The change in temperature is converted with the thermal-actuation component into a deformation or mechanical movement. The deformation or mechanical movement is sensed with a strain sensor that undergoes a change in electrical resistance in response to the sensed deformation or mechanical movement. An electrical current is directed through an electrical circuit that includes the strain sensor, and the change in the electrical resistance of the circuit is detected. Bolometers described herein can introduce a thermo-strain-resistance effect instead of a direct thermo-resistance effect by combining a thermal actuation component with a highly sensitive strain sensor, wherein EM-radiation-induced heating is transduced into a change of resistance through mechanical deformation of the strain sensor. Embodiments of the device can include: (1) an EM-wave absorber that efficiently absorbs the incident EM radiation and generates, either globally or locally, a change of temperature; (2) a thermal-mechanical transducer that converts the temperature difference into a deformation or mechanical movement; and (3) a strain sensor that senses such deformation or mechanical movement and eventually results in a resistance change of the device, which can then be probed by an electronic circuit. Since these three components can be optimized relatively independently, an ultra-high temperature coefficient of resistance (TCR), a key figure of merit for bolometers, may be achieved. As a proof-of-concept demonstration, we fabricated a graphene nano-fragment resistance network/polymer hybrid structure with a TCR of as high as 5 $K^{-1}$, which is at least one order of magnitude better than state-of-the-art bolometers. Devices described herein can also be low-cost and possess good biocompatibility and decent flexibility, which can be of great significance as sensing components in future ubiquitous electronics. Still further, the mechanical flexibility of the devices allows the fabrication of the focal plane array on a curved substrate.

Figure 1:
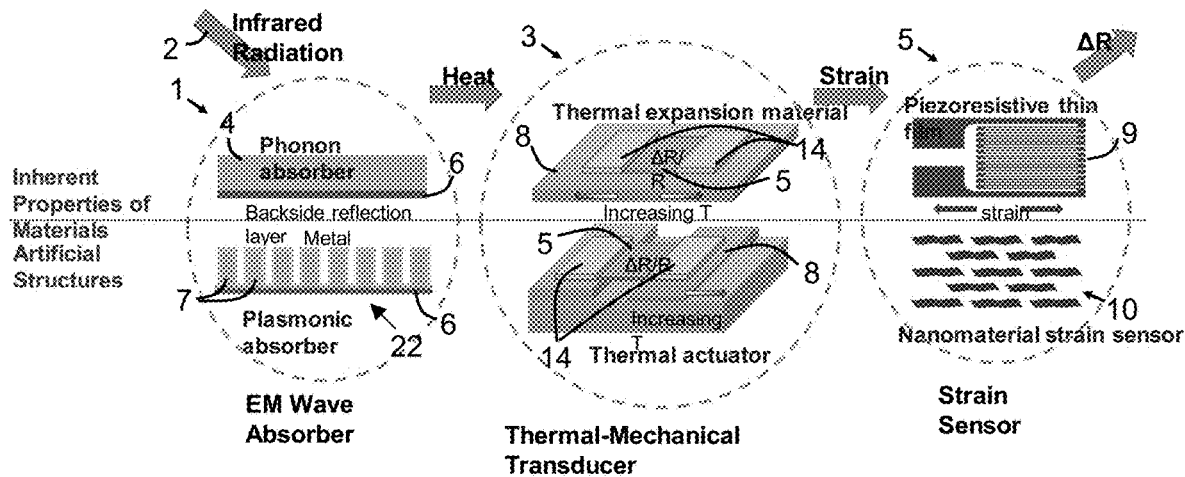
FIG. 1 is a schematic illustration of a signal-transducing path of a thermo-mechanical bolometer.

In the accompanying drawings, like reference characters refer to the same or similar parts throughout the different views. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances.

Percentages or concentrations expressed herein can be in terms of weight or volume. Processes, procedures and phenomena described below can occur at ambient pressure (e.g., about 50-120 kPa—for example, about 90-110 kPa), though the actual device can work at low pressure (<1 Pa), and temperature (e.g., −20 to 150° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. The term, "about," means within ±10% of the value recited. In addition, where a range of values is provided, each subrange and each individual value between the upper and lower ends of the range is contemplated and therefore disclosed.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

A thermo-mechanical bolometer includes at least one thermal-actuation component and a strain sensor. The thermal actuation component includes a composition that (a) aborbs EM waves and converts energy from the absorbed waves into a change in temperature (e.g., an increase in temperature) and (b) converts the change in temperature into deformation of a component. These two functions can be performed by the same composition or by different compositions.

The components as well as the signal-transducing path of a thermo-mechanical bolometer are schematically illustrated in FIG. 1. A first part of an exemplification of a thermal-actuation component is an electromagnetic wave absorber 11 in which the incident EM wave 2 is absorbed by a phonon absorber 4 with a backside reflection layer 6 and converted into a change in temperature. This conversion involves a co-optimization of the electromagnetic wave propagation and the heat-transfer process of such an absorber 4. In the mid-IR range, incident light can be absorbed through optical phonon resonance of solids or via excitation of the vibrational mode of molecules in the absorber 4. This inherent form of light-matter interaction exists predominantly in diverse material systems, and many of them lie in the mid-IR range and can, therefore, provide a substantially strong interaction.

For example, many dielectrics that are commonly used in modern silicon integrated-circuit (IC) or micro-electro-mechanical-system (MEMS) foundries, including silicon dioxide ($SiO_2$), silicon nitride ($Si_3N_4$), aluminum oxide ($Al_2O_3$), etc., have a strong optical phonon absorption peak in the 8-14 µm range. In addition, most of the IR-active vibrations of functional groups in polymers or other organic materials can also be utilized to harvest the energy of incident IR radiations.

Examples of compositions suitable for absorbing EM waves and generating a temperature change in a thermal-actuation component can include the following: polydimethylsiloxane, polyarylamide dibenzocyclooctadiene, (S,S)-octa-3,5-diyn-2,7-dio, polydimethylsiloxane, polyethylene, ethylene-vinyl acetate, photoresist, polycarbonate, polypropylene carbonate, polypropylene, polyvinyl chloride, polyvinyl alcohol, polyvinyl fluoride, polyvinylidene chloride, polyvinylidene fluoride, polystyrene, polytetrafluoroethylene, polychlorotrifluoroethylene, poly(methyl methacrylate), polyethylene terephthalate, polyamide, polyimide, polyamide-imide, polybutadiene, polyisobutylene, polybutylene terephthalate, para-aramid, polychloroprene, polyacrylonitrile, copolyamide, poly-p-phenylene-2,6-bezobisoxazole, poly(vinylidene chloride), cis-polyisoprene, polyphenylene sulfide, polyphenylene oxide, polyparaphenylene terephthalamide, epoxy, phenol-formadehyde resin, melamine-formaldehyde, polyetheretherketone, polyhexamethylene adipamide, poly (3,4-ethylenedioxythiophene), poly (3,4-ethylenedioxythiophene) poly (styrenesulfonate), silicon oxide, aluminum oxide, hafnium oxide, titanium oxide, zinc oxide, zirconium oxide, lithium oxide, scandium oxide, strontium oxide, yttrium oxide, tantalum oxide, barium oxide, molybdenum oxide, tungsten oxide, calcium oxide, beryllium oxide, vanadium oxide, magnesium oxide, hafnium silicon oxide, aluminum lithium oxide, impurity-doped zin oxides, impurity-doped tin oxides, impurity-doped indium oxides, silicon nitride, aluminum nitride, gallium nitride, indium nitride, aluminum gallium nitride, indium gallium nitride, titanium nitride, silicon, germanium, gallium arsenide, aluminum arsenide, aluminum gallium arsenide, indium arsenide, indium gallium arsenide, aluminum indium arsenide, indium phosphide, gallium phosphide, gallium indium phosphide, aluminum antimonide, gallium antimonide, indium antimonide, aluminum gallium antimonide, gallium indium antimonide, aluminum indium antimonide, silicon carbide, zinc sulfide, zinc selenide, zinc telluride, cadmium sulfide, cadmium selenide, cadmium telluride, aluminum, gold, silver, nickel, tungsten, platinum, palladium, titanium, chromium, copper, molybdenum, indium, or combinations of the aforementioned materials.

In additional embodiments, the thermal-actuation component comprises an electromagnetic-wave-absorbing composition selected from organic compositions with at least one infra-red-active functional group, including but not limited to alkenes, alcohols, alkynes, amines, amides, carboxylic acids, esters, nitriles, ketones, and benzene rings.

In other exemplifications, the thermal-actuation component comprises an electromagnetic-wave-absorbing composition that is in the form of photonic crystals, metasurfaces, optical metamaterials, or an array of nano-antennas. For example, a periodic array of metal "nano-antennas" 7 can form a plasmonic absorber 22, as shown in FIG. 1; and the plasmonic resonances in the antenna array 7 can be used to modulate the local EM field, which may give rise to very-efficient IR absorption. The nano-antennas can be made of metals, such as gold or aluminum, or graphene.

Regarding optimization of the heat-transfer process, both the heat capacity and the thermal conductance are reduced to increase the temperature difference for a given amount of incident EM energy. To achieve this goal, the absorber can be made thin and suspended on the substrate. The following two variables are used to characterize the IR absorber 4: (1) the absorbance (A), defined as the percentage of the light intensity that is being absorbed, and (2) the thermal resistance ($R_{th}$), defined as the temperature elevation of the structure per absorbed EM power.

In a second part of this thermal-actuation component, the change in temperature is converted to a mechanical deformation through a thermo-mechanical transducer 13. This conversion can be realized by using the natural thermal expansion properties of materials 13—i.e., the change in shape, area, and volume of matter 13 in response to a change in temperature. The linear coefficient of thermal expansion (CTE), $\alpha$, is defined as $\alpha = (dX/X)/dT$, in which X denotes the length of the film; and T represents the temperature. Table 2, below, summarizes $\alpha$ for a wide variety of materials. Such effect can also be utilized to fabricate a MEMS thermal actuator, in which a small amount of thermal expansion of one part of the device translates to a large amount of deflection of the overall device. In this case, only a localized temperature change is required, which reduces the thermal mass that needs to be heated by the IR radiation; and the resulting strain can be sufficiently large, although such a device may add structural complexity and extra cost to the device.

Examples of compositions that can mechanically transform (e.g., deform or mechanically move) in response to a change in temperature in a thermal-actuation component include the following: polydimethylsiloxane, polyarylamide dibenzocyclooctadiene, (S,S)-octa-3,5-diyn-2,7-dio, polydimethylsiloxane, polyethylene, ethylene-vinyl acetate, photoresist, polycarbonate, polypropylene carbonate, polypropylene, polyvinyl chloride, polyvinyl alcohol, polyvinyl fluoride, polyvinylidene chloride, polyvinylidene fluoride, polystyrene, polytetrafluoroethylene, polychlorotrifluoroethylene, poly(methyl methacrylate), polyethylene terephthalate, polyamide, polyimide, polyamide-imide, polybutadiene, polyisobutylene, polybutylene terephthalate, para-aramid, polychloroprene, polyacrylonitrile, copolyamide, poly-p-phenylene-2,6-bezobisoxazole, poly(vinylidene chloride), cis-polyisoprene, polyphenylene sulfide, polyphenylene oxide, polyparaphenylene terephthalamide, epoxy, phenol-formadehyde resin, melamine-formaldehyde, polyetheretherketone, polyhexamethylene adipamide, poly (3,4-ethylenedioxythiophene), poly (3,4-ethylenedioxythiophene) poly (styrenesulfonate), silicon oxide, aluminum oxide, hafnium oxide, titanium oxide, zinc oxide, zirconium oxide, lithium oxide, scandium oxide, strontium oxide, yttrium oxide, tantalum oxide, barium oxide, molybdenum oxide, tungsten oxide, calcium oxide, beryllium oxide, vanadium oxide, magnesium oxide, hafnium silicon oxide, aluminum lithium oxide, impurity-doped zin oxides, impurity-doped tin oxides, impurity-doped indium oxides, silicon nitride, aluminum nitride, gallium nitride, indium nitride, aluminum gallium nitride, indium gallium nitride, titanium nitride, silicon, germanium, gallium arsenide, aluminum arsenide, aluminum gallium arsenide, indium arsenide, indium gallium arsenide, aluminum indium arsenide, indium phosphide, gallium phosphide, gallium indium phosphide, aluminum antimonide, gallium antimonide, indium antimonide, aluminum gallium antimonide, gallium indium antimonide, aluminum indium antimonide, silicon carbide, zinc sulfide, zinc selenide, zinc telluride, cadmium sulfide, cadmium selenide, cadmium telluride, aluminum, gold, silver, nickel, tungsten, platinum, palladium, titanium, chromium, copper, molybdenum, indium, or combinations of the aforementioned materials.

Table 2 [summary of linear CTE (α) for a variety of materials]:

| Material | α (×10$^{-6}$K$^{-1}$) at 295 K |
|---|---|
| polyacrylamide-dibenzocyclooctadiene (PAAM + DBCOD) | −1,200 |
| (S,S)-octa-3,5-diyn-2,7-diol | 225-330 |
| polydimethylsiloxane (PDMS) | 310 |
| polyethylene (PE) | 200 |
| ethylene-vinyl acetate (EVA) | 180 |
| SU-8 epoxy-based negative photoresist | 102 |
| polypropylene carbonate (PPC) | 100 |
| poly(methyl methacrylate) (PMMA) | 70-77 |
| polyethylene terephthalate (PET) | 59 |
| Polyimide | 20-70 |
| silicon nitride (Si$_3$N$_4$) | 0.8 |
| silicon dioxide (SiO$_2$) | 0.5 |
| silicon (Si) | 2.33 |
| aluminum oxide (Al$_2$O$_3$) | 8.7 |
| aluminum (Al) | 25 |
| gold (Au) | 14.2 |

In the above, table, (S,S)-octa-3,5-diyn-2,7-diol is described in D. Das, et al., "Exceptionally Large Positive and Negative Anisotropic Thermal Expansion of an Organic Crystalline Material," 9 Nature Materials 36-39 (January 2010); and, in other embodiments, the following commercial photoresists have been used in place of SU-8 photoresist: MEGAPOSIT SPR 700 positive multi-wavelength photoresist and AZ5214E photoresist from Microchemicals GmbH).

Thirdly, a strain-sensitive material or structure 5 is introduced to detect the strain generated by the thermo-mechanical transducer 3 and convert it into an electrical signal. One can either (a) employ the inherent piezoresistive effect of materials 9, where the resistance changes due to modifications of geometry or electronic structure of the piezoresistive materials 9, which can be in the form of a thin film with respect to the applied strain, or (b) leverage the "percolation" of the nano-fragment resistance network in a film 10 due to the applied strain provided by expansion of the thermal-expansion material 8, which leads to a strain-dependent resistivity.

Examples of compositions that can form a resistance network of nanomaterials to serve as the strain sensor 5 can include fragments selected from the following compositions: graphene, graphite, graphene oxide, reduced graphene oxide, graphene composites, graphene derivatives, carbon blacks, metallic transition metal dichalcogenides, metallic metal carbides, metallic metal nitrides, metallic carbonitrides, carbon nanotubes, metallic nanowires, metallic nanorods, metallic nanoribbons, metallic nanoparticles, metallic nanospheres, and compositions of polymers and the aforementioned nanomaterials.

Examples of additional compositions that can form conductive thin films (of fragments separated by gaps) that serve as the strain sensor can include at least one composition selected from aluminum, gold, silver, nickel, tungsten, platinum, palladium, titanium, chromium, copper, molybdenum, indium, silicon, germanium, graphene, graphite, graphene oxide, reduced graphene oxide, graphene composites, graphene derivatives, metallic transition metal dichalcogenides, metallic metal carbides, metallic metal nitrides, metallic carbonitrides, impurity-doped zin oxides, impurity-doped tin oxides, impurity-doped indium oxides, poly (3,4-ethylenedioxythiophene), and poly (3,4-ethylenedioxythiophene) poly (styrenesulfonate).

The gaps that separate the fragments can be defined by a self-assembled monolayer selected from thiol, silane, alcohol, carboxylic acid, amine, imine, and nitrile. Additionally, the gaps that separate the conductive fragments can be defined by photolithography, electron-beam lithography, interference lithography, nanoimprint lithography, focused-ion beam lithography, block-copolymer lithography, self-aligned physical vapor deposition, self-aligned reactive ion etching, atomic layer deposition, atomic layer etching or a combination of the aforementioned fabrication technologies.

A figure of merit to benchmark this component is the gauge factor (GF), expressed as GF=(dR/(dX/X), with R denoting resistance. As discussed in the following section, the GF of nano-fragment films 10 made from graphene can be much better than that of conventional piezoresistive thin films 9.

Characterizing the nano-fragment films 10 as "percolative" refers to the geometry of the nano-fragment film 10, wherein the nano-fragments are randomly distributed throughout a 2D plane, so each fragment is connected with adjacent fragments (with a certain randomness) electrically. Such a form of connection can be understood by the "percolation theory."

Based on the above analysis, the TCR of the device proposed herein can be expressed as follows:

$$TCR = \frac{1}{R}\frac{dR}{DT} = \left(\frac{1}{x}\frac{dX}{dT}\right) \cdot \left(\frac{dR/R}{dX/X}\right) = a \cdot GF. \quad (2)$$

In addition, our proposed sensing mechanism can also be applied to detectors other than IR detectors, such as chemical sensors, by changing the IR absorption layer with a chemically functionalized layer that can transduce chemical composite information into a mechanical expansion/temperature difference.

Exemplification of the Device:

An example of a prototype bolometer 16 is made by hybridizing a graphene nano-fragment resistance network film as the strain-sensing component 5, and a polymer base (such as either PDMS or SPR700 positive photoresist from Dow) as both the IR absorber 4 and the thermal-actuation component. The type of the polymer was chosen based on achieving a good balance between the elastic modulus and the thermal expansion coefficient of the polymer, and the available silicon-oxide or carbon-oxide bonds that could interact strongly with radiation in the longwave IR (LWIR) spectral range (8-12 μm). A percolative graphene film made from electrochemically exfoliated graphene nano-fragments is chosen as the strain-sensing component 5 because of its large gauge factor (GF). Table 3 summarizes the maximum GF of graphene-based strain sensors reported in literature and the predicted temperature coefficient of resistance (TCR) if placed on top of a PDMS thermal-expansion layer 8. Comparing the predicted TCR of the graphene/PDMS thermo-mechanical bolometers with the mainstream bolometers in Table 1, we predict that the new device, described herein, may be a competitive alternative to mainstream bolometers.

Table 3 (summary of graphene-based strain sensors with their reported maximum gauge factors and predicted TCR when combined with PDMS):

| Material | $GF_{MAX}$ | Predicted TCR ($K^{-1}$) with PDMS |
|---|---|---|
| graphene/PVA/rubber | 1800 | 0.56 |
| self-assembled graphene | 1037 | 0.32 |
| graphene woven fabrics | 1000 | 0.31 |
| graphene-silicone composites | 600 | 0.19 |
| spray-coated graphene with surfactant | 160 | 0.05 |
| chemical-vapor deposited (CVD) graphene with wrinkles | 151 | 0.05 |
| graphene—carbon-nanotube (CNT) composites | 100 | 0.03 |
| laser-scribed reduced graphene oxide (rGO) | 10 | 0.003 |

In additional embodiments, the strain sensor 5 comprises a resistance network of nanomaterials (with dimensions or gaps in the nano-scale—e.g., less than 100 nm), including fragments in the form of graphene, graphite, graphene oxide, reduced graphene oxide, graphene composites, carbon nanotubes, metallic nanowires, metallic nanoparticles, or compositions of polymers and the aforementioned nanomaterials.

In still other embodiments, the strain sensor 5 can comprise a conductive thin film, comprising gold, silver, platinum, and/or graphite, where the gaps separate the film composition into fragments.

Figure 5:
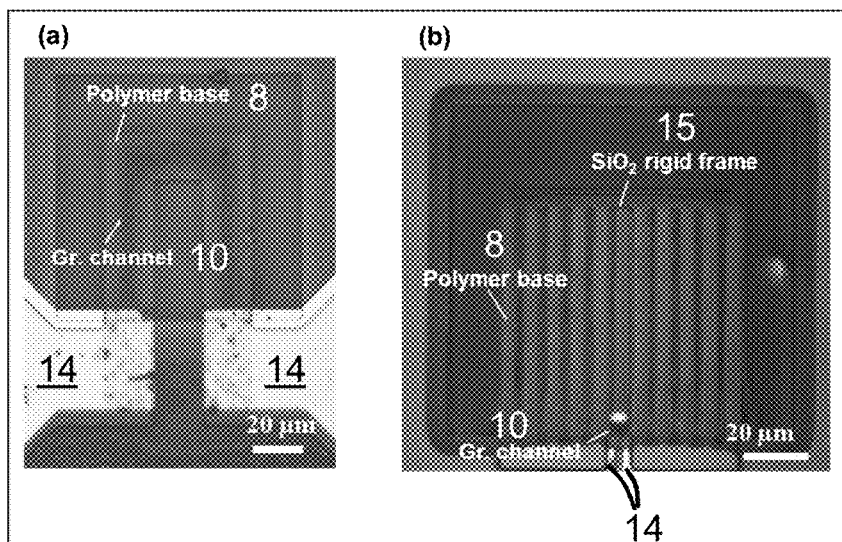
FIG. 5 shows the optical microscopic images of as-fabricated graphene-polymer thermo-mechanical bolometers; (a) employs the vertical geometry, and (b) employs the lateral geometry.

Graphene nano-fragment dispersions were prepared through electrochemical exfoliation in a sulfuric acid electrolyte, followed by the exchange of the solvent with butanol. The dispersion is then sonicated and diluted to obtain the desired average flake sizes and flake concentrations. The percolative graphene film, serving as the strain sensor 5, is self-assembled through a Marangoni effect at the water/alcohol interface. The GFs of the assembled films are measured to be 10-150, depending on the parameters of the dispersions; and typical optical microscopic and scanning electron microscopic (SEM) images of the films are shown in FIG. 5.

Figure 2:
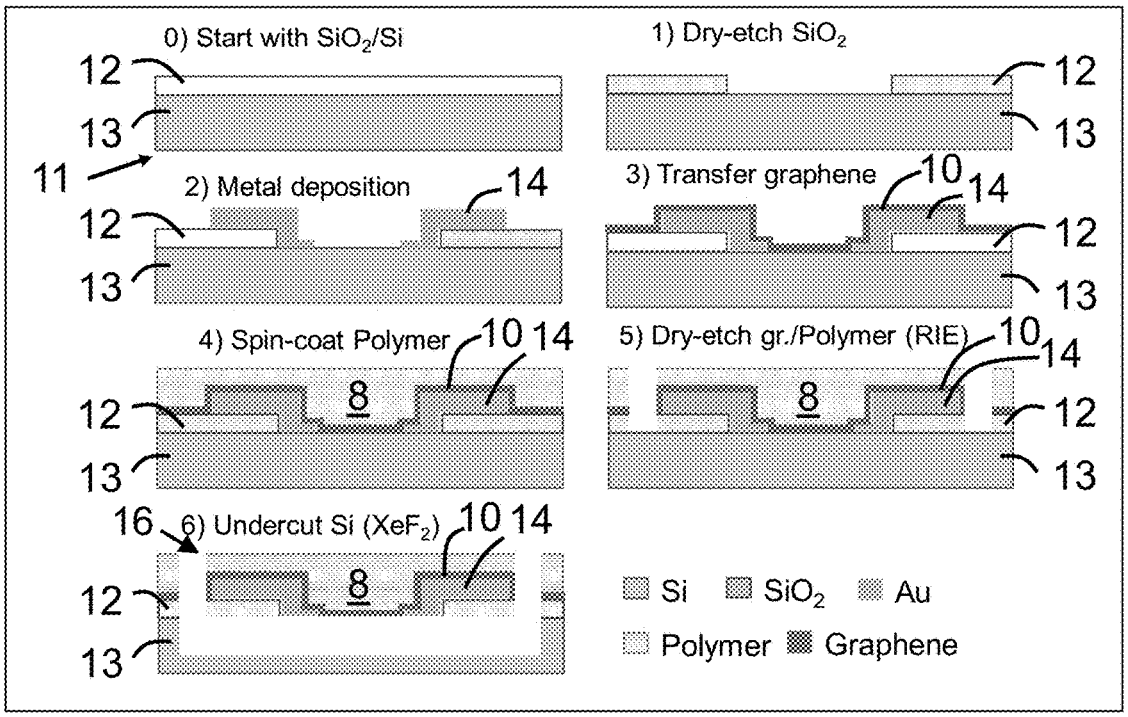
FIG. 2 shows steps in a process flow for fabricating a graphene nano-fragment resistance network/polymer thermo-mechanical bolometer.
Figure 3:
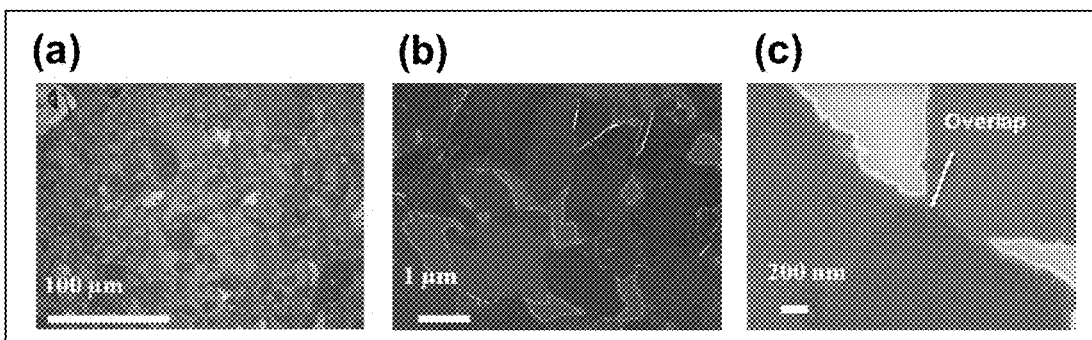
FIG. 3 shows the morphologies of graphene film produced by the Marangoni self-assembly method; (a) is an optical microscopic image, while (b) and (c) are scanning electron microscopic (SEM) images with different magnifications.

A fabrication process flow for the thermo-mechanical bolometer 16 is shown in FIG. 2. A 300-nm $SiO_2$/Si wafer 11 is used as a substrate (step 0). Firstly, a photolithography and a reactive ion etching (RIE) step (step 1) with $CF_4$ and $O_2$ as the reactive gas is employed to open windows in the $SiO_2$ layer 12 on the silicon layer 13. In step 2, gold electrodes 14 are defined by photolithography and deposited through e-beam evaporation followed by a lift-off process. In step 3, the substrate 11 is treated with diluted potassium hydroxide solution, and a percolative graphene film, as the strain sensor 5, is transferred onto it. If the graphene film has a different pattern than the polymer thermal-expansion layer 8, photolithography and RIE with $O_2$ and He are carried out to define the graphene channel. In step 4, the polymer (e.g., PDMS dissolved in hexane, or SPR700 photoresist) is spin-coated onto the structure followed by baking at a required temperature to cure the resulting polymer thermal-expansion film 8. In step 5, another photolithography step is performed to define the patterns of the polymer thermal-expansion film 8; and a RIE with $CF_4$ and $O_2$ is performed to etch the unwanted PDMS film if PDMS is used to form the polymer thermal-expansion film 8. Finally, $XeF_2$ etching is employed to undercut the underlining silicon 13 to suspend the thermo-mechanical bolometer 16. Although this process is currently designed for a silicon-based platform, it is also possible to replace the supporting film with glass, plastics, or any other low-cost/flexible substrate.

Figure 4:
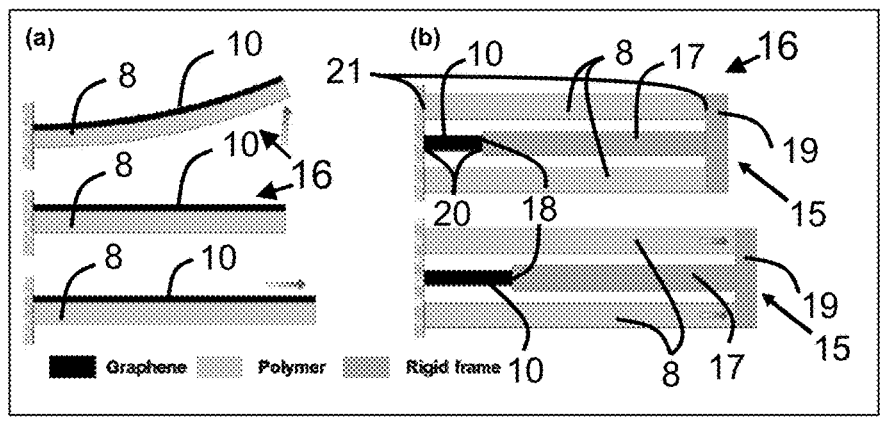
FIG. 4 shows the schematics of vertical [panel (a), side view] and lateral [panel (b), top view] thermo-mechanical bolometers.

Two exemplary geometries are considered in the implementation of the proposed bolometers 16 (see FIG. 4). In the vertical structure (a), the percolative graphene film (channel) 5 and the polymer thermal-expansion layer 8 are stacked directly on top of each other, whereas in the lateral structure (b), the graphene channel 5 and the polymer thermal-expansion layer 8 are placed on the same plane, and connected through a "T"-shaped rigid frame 38 [i.e., that is more rigid (stretches less) than the graphene channel 5 and polymer thermal-expansion layer 8 during the thermal expansion]. In the vertical structure (a), because of the mismatch of the thermal expansion coefficients and the elastic modulus between the two layers 5 and 8, both the lateral expansion and the vertical bending need to be taken into account. In the lateral structure (b), however, the symmetric mechanical architecture makes the lateral expansion dominate the thermal deformation. In addition, the "T"-shaped member of the rigid frame 15 transfers the larger displacement induced by the longer polymer thermal-expansion component 8 to the shorter graphene channel 5, which equivalently amplifies the strain of the graphene channel 5. The "T"-shaped rigid member of the rigid frame 15 includes a trunk 17 having a base 18 and a cross bar 19 attached orthogonally to the trunk 17 at an opposite end of the trunk 17 from the base 18. The graphene nano-fragment film 10 is mounted to the base 18, and a pair of the thermal-expansion components 8 are mounted to the cross-bar 19 on opposite sides of the trunk 17.

The rigid frame 15 includes a first pair of mount positions 20 across which the graphene nano-fragment film 10 is mounted and a second pair of mount positions 21 across which the thermal-expansion material 8 is mounted, wherein the second pair of mount positions 21 are separated by a greater distance than are the first pair of mount positions 20; and the rigid frame 15 is less elastic than either the thermal-expansion component 8 or the nano-fragment film 10 so as to amplify stretching of the nano-fragment film 10 with a change in temperature of the thermal-expansion component 8.

FIG. 5 shows microscopic images of as-fabricated vertical (a) and lateral (b) thermo-mechanical bolometers.

Figure 6:
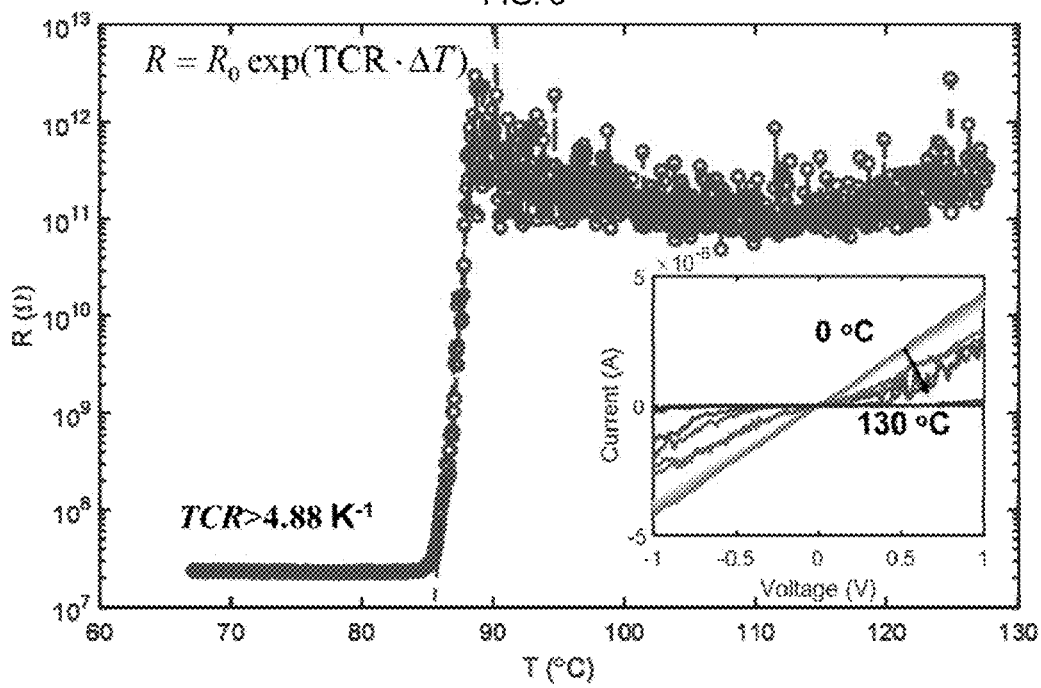
FIG. 6 plots the electrical resistance as a function of the temperature of a typical graphene/polymer thermo-mechanical bolometer. The TCR at the transition temperature was extracted to be greater than 4.88 $K^{-1}$. The inset shows the current-voltage relations of such a device at different temperatures.

The temperature responses of the graphene/polymer thermo-mechanical bolometers were measured. Two distinct behaviors were observed. Firstly, all of the devices exhibited a gradual negative correlation between the electrical resistance and the temperature. The TCRs extracted from this regime range from $-0.001$ $K^{-1}$ to $-0.013$ $K^{-1}$. Secondly, at elevated temperature, some of the devices showed a very sharp resistance increase. The transition temperature varies from room temperature to 100° C., and the maximum TCR was measured to be as high as 4.88 $K^{-1}$ (FIG. 6). Such a TCR value is at least one order of magnitude higher than state-of-the-art bolometric materials.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention. In method claims (or where methods are elsewhere recited), where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A thermo-mechanical bolometer, comprising:
at least one solid thermal-actuation component that, alone or in combination, (a) absorbs electromagnetic waves and converts energy from absorbed electromagnetic waves into a change in temperature and (b) converts the change in temperature into a deformation of the at least one component; and
a strain sensor mounted in parallel with the at least one thermal-actuation component and configured to expand therewith, wherein the strain sensor comprises a layer of fragments with a gap space between the fragments, wherein the strain sensor senses the deformation or mechanical movement and exhibits a change in electrical resistance in response to the sensed deformation or mechanical movement.

2. The thermo-mechanical bolometer of claim 1, wherein the strain sensor forms part of an electrical circuit that detects the change in electrical resistance in the strain sensor.

3. The thermo-mechanical bolometer of claim 1, wherein the solid thermal-actuation component is a single composition that both absorbs electromagnetic waves and that produces a deformation or mechanical movement in response to a change in temperature resulting from the absorption of electromagnetic waves.

4. The thermo-mechanical bolometer of claim 3, wherein the thermal-actuation component comprises a composition selected from polydimethylsiloxane, polyarylamide dibenzocyclooctadiene, (S,S)-octa-3,5-diyn-2,7-dio, polydimethylsiloxane, polyethylene, ethylene-vinyl acetate, photoresist, polycarbonate, polypropylene carbonate, polypropylene, polyvinyl chloride, polyvinyl alcohol, polyvinyl fluoride, polyvinylidene chloride, polyvinylidene fluoride, polystyrene, polytetrafluoroethylene, polychlorotrifluoroethylene, poly(methyl methacrylate), polyethylene terephthalate, polyamide, polyimide, polyamide-imide, polybutadiene, polyisobutylene, polybutylene terephthalate, para-aramid, polychloroprene, polyacrylonitrile, copolyamide, poly-p-phenylene-2,6-bezobisoxazole, poly(vinylidene chloride), cis-polyisoprene, polyphenylene sulfide, polyphenylene oxide, polyparaphenylene terephthalamide, epoxy, phenol-formadehyde resin, melamine-formaldehyde, polyetheretherketone, polyhexamethylene adipamide, poly (3,4-ethylenedioxythiophene), poly (3,4-ethylenedioxythiophene) poly (styrenesulfonate), silicon oxide, aluminum oxide, hafnium oxide, titanium oxide, zinc oxide, zirconium oxide, lithium oxide, scandium oxide, strontium oxide, yttrium oxide, tantalum oxide, barium oxide, molybdenum oxide, tungsten oxide, calcium oxide, beryllium oxide, vanadium oxide, magnesium oxide, hafnium silicon oxide, aluminum lithium oxide, impurity-doped zin oxides, impurity-doped tin oxides, impurity-doped indium oxides, silicon nitride, aluminum nitride, gallium nitride, indium nitride, aluminum gallium nitride, indium gallium nitride, titanium nitride, silicon, germanium, gallium arsenide, aluminum arsenide, aluminum gallium arsenide, indium arsenide, indium gallium arsenide, aluminum indium arsenide, indium phosphide, gallium phosphide, gallium indium phosphide, aluminum antimonide, gallium antimonide, indium antimonide, aluminum gallium antimonide, gallium indium antimonide, aluminum indium antimonide, silicon carbide, zinc sulfide, zinc selenide, zinc telluride, cadmium sulfide, cadmium selenide, cadmium telluride, aluminum, gold, silver, nickel, tungsten, platinum, palladium, titanium, chromium, copper, molybdenum, indium, and combinations of the aforementioned materials.

5. The thermo-mechanical bolometer of claim 1, wherein the at least one thermal-actuation component comprises (a) an electromagnetic-wave-absorbing composition that converts energy from absorption of electromagnetic waves into a change in temperature and (b) a mechanically transforming composition that converts the change in temperature into a deformation or mechanical movement, where the electromagnetic-wave absorbing composition is compositionally distinct from the mechanically transforming composition.

6. The thermo-mechanical bolometer of claim 5, wherein the electromagnetic-wave-absorbing composition forms a first layer, and wherein the mechanically transforming composition forms a second layer connected to the first layer.

7. The thermo-mechanical bolometer of claim 5, wherein the electromagnetic-wave-absorbing composition and the mechanically transforming composition are mixed together in a single layer.

8. The thermo-mechanical bolometer of claim 5, wherein the thermal-actuation component comprises an electromagnetic-wave-absorbing composition selected from polydimethylsiloxane, polyarylamide dibenzocyclooctadiene, (S,S)-octa-3,5-diyn-2,7-dio, polydimethylsiloxane, polyethylene, ethylene-vinyl acetate, photoresist, polycarbonate, polypropylene carbonate, polypropylene, polyvinyl chloride, polyvinyl alcohol, polyvinyl fluoride, polyvinylidene chloride, polyvinylidene fluoride, polystyrene, polytetrafluoroethylene, polychlorotrifluoroethylene, poly(methyl methacrylate), polyethylene terephthalate, polyamide, polyimide, polyamide-imide, polybutadiene, polyisobutylene, polybutylene terephthalate, para-aramid, polychloroprene, polyacrylonitrile, copolyamide, poly-p-phenylene-2,6-bezobisoxazole, poly(vinylidene chloride), cis-polyisoprene, polyphenylene sulfide, polyphenylene oxide, polyparaphenylene terephthalamide, epoxy, phenol-formadehyde resin, melamine-formaldehyde, polyetheretherketone, polyhexamethylene adipamide, poly (3,4-ethylenedioxythiophene), poly (3,4-ethylenedioxythiophene) poly (styrenesulfonate), silicon oxide, aluminum oxide, hafnium oxide, titanium oxide, zinc oxide, zirconium oxide, lithium oxide, scandium oxide, strontium oxide, yttrium oxide, tantalum oxide, barium oxide, molybdenum oxide, tungsten oxide, calcium oxide, beryllium oxide, vanadium oxide, magnesium oxide, hafnium silicon oxide, aluminum lithium oxide, impurity-doped zin oxides, impurity-doped tin oxides, impurity-doped indium oxides, silicon nitride, aluminum nitride, gallium nitride, indium nitride, aluminum gallium nitride, indium gallium nitride, titanium nitride, silicon, germanium, gallium arsenide, aluminum arsenide, aluminum gallium arsenide, indium arsenide, indium gallium arsenide, aluminum indium arsenide, indium phosphide, gallium phosphide, gallium indium phosphide, aluminum antimonide, gallium antimonide, indium antimonide, aluminum gallium antimonide, gallium indium antimonide, aluminum indium antimonide, silicon carbide, zinc sulfide, zinc selenide, zinc telluride, cadmium sulfide, cadmium selenide, cadmium telluride, aluminum, gold, silver, nickel, tungsten, platinum, palladium, titanium, chromium, copper, molybdenum, indium, and combinations of the aforementioned materials.

9. The thermo-mechanical bolometer of claim 5, wherein the thermal-actuation component comprises an electromagnetic-wave-absorbing composition selected from organic compositions with at least one infra-red-active functional group, including but not limited to alkenes, alcohols, alkynes, amines, amides, carboxylic acids, esters, nitriles, ketones, and benzene rings.

10. The thermo-mechanical bolometer of any of claim 5, wherein the thermal-actuation component comprises an electromagnetic-wave-absorbing composition that is in the form of photonic crystals, metasurfaces, optical metamaterials, or an array of nano-antennas.

11. The thermo-mechanical bolometer of claim 5, wherein the thermal-actuation component comprises a mechanically transforming composition that undergoes a deformation or mechanical movement in response to a change in temperature, wherein the mechanically transforming composition is selected from polydimethylsiloxane, polyarylamide dibenzocyclooctadiene, (S,S)-octa-3,5-diyn-2,7-dio, polydimethylsiloxane, polyethylene, ethylene-vinyl acetate, photoresist, polycarbonate, polypropylene carbonate, polypropylene, polyvinyl chloride, polyvinyl alcohol, polyvinyl fluoride, polyvinylidene chloride, polyvinylidene fluoride, polystyrene, polytetrafluoroethylene, polychlorotrifluoroethylene, poly(methyl methacrylate), polyethylene terephthalate, polyamide, polyimide, polyamide-imide, polybutadiene, polyisobutylene, polybutylene terephthalate, para-aramid, polychloroprene, polyacrylonitrile, copolyamide, poly-p-phenylene-2,6-bezobisoxazole, poly(vinylidene chloride), cis-polyisoprene, polyphenylene sulfide, polyphenylene oxide, polyparaphenylene terephthalamide, epoxy, phenol-formaldehyde resin, melamine-formaldehyde, polyetheretherketone, polyhexamethylene adipamide, poly (3,4-ethylenedioxythiophene), poly (3,4-ethylenedioxythiophene) poly (styrenesulfonate), silicon oxide, aluminum oxide, hafnium oxide, titanium oxide, zinc oxide, zirconium oxide, lithium oxide, scandium oxide, strontium oxide, yttrium oxide, tantalum oxide, barium oxide, molybdenum oxide, tungsten oxide, calcium oxide, beryllium oxide, vanadium oxide, magnesium oxide, hafnium silicon oxide, aluminum lithium oxide, impurity-doped zin oxides, impurity-doped tin oxides, impurity-doped indium oxides, silicon nitride, aluminum nitride, gallium nitride, indium nitride, aluminum gallium nitride, indium gallium nitride, titanium nitride, silicon, germanium, gallium arsenide, aluminum arsenide, aluminum gallium arsenide, indium arsenide, indium gallium arsenide, aluminum indium arsenide, indium phosphide, gallium phosphide, gallium indium phosphide, aluminum antimonide, gallium antimonide, indium antimonide, aluminum gallium antimonide, gallium indium antimonide, aluminum indium antimonide, silicon carbide, zinc sulfide, zinc selenide, zinc telluride, cadmium sulfide, cadmium selenide, cadmium telluride, aluminum, gold, silver, nickel, tungsten, platinum, palladium, titanium, chromium, copper, molybdenum, indium, and combinations of the aforementioned materials.

12. The thermo-mechanical bolometer of claim 1, wherein the strain sensor comprises a resistance network of nanomaterials, including fragments selected from the following compositions: graphene, graphite, graphene oxide, reduced graphene oxide, graphene composites, graphene derivatives, carbon blacks, metallic transition metal dichalcogenides, metallic metal carbides, metallic metal nitrides, metallic carbonitrides, carbon nanotubes, metallic nanowires, metallic nanorods, metallic nanoribbons, metallic nanoparticles, metallic nanospheres, and compositions of polymers and the aforementioned nanomaterials.

13. The thermo-mechanical bolometer of claim 1, wherein the strain sensor comprises a conductive thin film in the form of fragments separated with gaps, wherein the conductive thin film comprises at least one composition selected from aluminum, gold, silver, nickel, tungsten, platinum, palladium, titanium, chromium, copper, molybdenum, indium, silicon, germanium, graphene, graphite, graphene oxide, reduced graphene oxide, graphene composites, graphene derivatives, metallic transition metal dichalcogenides, metallic metal carbides, metallic metal nitrides, metallic carbonitrides, impurity-doped zin oxides, impurity-doped tin oxides, impurity-doped indium oxides, poly (3,4-ethylenedioxythiophene), and poly (3,4-ethylenedioxythiophene) poly (styrenesulfonate).

14. The thermo-mechanical bolometer of claim 13, wherein the gaps that separate the fragments are defined by a self-assembled monolayer selected from thiol, silane, alcohol, carboxylic acid, amine, imine, and nitrile.

15. The thermo-mechanical bolometer of claim 13, wherein the gaps that separate the conductive fragments are defined by photolithography, electron-beam lithography, interference lithography, nanoimprint lithography, focused-ion beam lithography, block-copolymer lithography, self-aligned physical vapor deposition, self-aligned reactive ion etching, atomic layer deposition, atomic layer etching or a combination of the aforementioned fabrication technologies.

16. The thermo-mechanical bolometer of claim 1, further comprising a rigid frame with a first pair of mount positions across which the thermal-expansion component is mounted and a second pair of mount positions across which the thermal-actuation component is mounted, wherein the second pair of mount positions are separated by a greater distance than are the first pair of mount positions, wherein the rigid frame is less elastic than either the thermal-expansion component or the thermal-actuation component so as to amplify stretching of the thermal-actuation component with a change in temperature of the thermal-expansion component.

17. The thermo-mechanical bolometer of claim 16, wherein the rigid frame includes a T-shaped member with a trunk having a base and a cross bar attached orthogonally to the trunk at an opposite end of the trunk from the base, wherein the thermal-actuation component is mounted to the base and wherein a pair of the thermal-expansion components are mounted to the cross-bar on opposite sides of the trunk.

18. A method for measuring electromagnetic radiation, comprising:
   providing a thermo-mechanical bolometer, comprising at least one solid thermal-actuation component;
   absorbing electromagnetic radiation with the solid thermal-actuation component to produce a change in temperature;
   converting the change in temperature with the solid thermal-actuation component into a deformation or mechanical movement;
   sensing the deformation or mechanical movement with a strain sensor that undergoes a change in electrical resistance in response to the sensed deformation or mechanical movement; and
   directing an electrical current through an electrical circuit that includes the strain sensor and detecting the change in the electrical resistance of the circuit.

19. The method of claim 18, further comprising correlating the change in electrical resistance with a measure of incident electromagnetic radiation.

\* \* \* \* \*